US011993289B2

(12) United States Patent
Tsuchida et al.

(10) Patent No.: US 11,993,289 B2
(45) Date of Patent: May 28, 2024

(54) VEHICLE CONTROL SYSTEM AND VEHICLE CONTROL METHOD

(71) Applicant: HITACHI ASTEMO, LTD., Hitachinaka (JP)

(72) Inventors: Hiroshi Tsuchida, Ibaraki (JP); Naoto Aoki, Ibaraki (JP); Akira Kuriyama, Ibaraki (JP); Shigenori Hayase, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 231 days.

(21) Appl. No.: 17/609,562

(22) PCT Filed: May 15, 2020

(86) PCT No.: PCT/JP2020/019403
§ 371 (c)(1),
(2) Date: Nov. 8, 2021

(87) PCT Pub. No.: WO2020/235466
PCT Pub. Date: Nov. 26, 2020

(65) Prior Publication Data
US 2022/0227396 A1   Jul. 21, 2022

(30) Foreign Application Priority Data

May 23, 2019   (JP) .................... 2019-96642

(51) Int. Cl.
*B60W 60/00* (2020.01)
*G01C 21/28* (2006.01)
*H04L 12/40* (2006.01)

(52) U.S. Cl.
CPC . *B60W 60/0027* (2020.02); *B60W 2554/4041* (2020.02); *B60W 2554/4042* (2020.02)

(58) Field of Classification Search
CPC ......... G01C 21/28; F02D 41/26; G01S 7/497; G01S 13/867; G08G 1/054;
(Continued)

(56) References Cited

U.S. PATENT DOCUMENTS 4,405,940 A * 9/1983 Woolfson ............... G06V 10/88
348/170
5,809,161 A * 9/1998 Auty ...................... G08G 1/054
382/104

(Continued)

FOREIGN PATENT DOCUMENTS

DE   102011087339 A1 * 11/2012 ............ B61L 25/021
JP   2004-038640 A   2/2004
(Continued)

OTHER PUBLICATIONS

International Search Report with English translation and Written Opinion issued in corresponding application No. PCT/JP2020/019403 dated Aug. 25, 2020.

*Primary Examiner* — Yuri Kan
(74) *Attorney, Agent, or Firm* — Foley & Lardner LLP

(57) ABSTRACT

To improve accuracy of a grouping process by accurately obtaining an error of an observation value of a sensor.

A vehicle control system includes an integration unit that estimates information on a position and a speed of a target existing in an external field, and errors of the position and the speed based on information from a sensor that acquires information on the external field of an own vehicle. The integration unit estimates an error of a detection result from the detection result of a sensor that detects an external field of a vehicle in accordance with a characteristic of the sensor, determines correlation between detection results of a plu- (Continued)

rality of the sensors, and integrates correlated detection results and calculates the errors of the position and the speed of the target.

10 Claims, 7 Drawing Sheets

(58) Field of Classification Search
CPC .... G08G 1/09623; G08G 1/166; G06V 10/88; B60W 40/04; B60W 30/162; H04L 12/40; H04W 4/44; G06T 7/20; F41G 3/323
See application file for complete search history.

(56) References Cited

U.S. PATENT DOCUMENTS

| | | | |
|---|---|---|---|
| 2003/0140866 A1* | 7/2003 | Malakatas | F41G 3/323 119/524 |
| 2006/0287824 A1 | 12/2006 | Lin | |
| 2017/0358102 A1* | 12/2017 | Akiyama | G06T 7/20 |
| 2018/0182245 A1* | 6/2018 | Takabayashi | H04W 4/44 |
| 2018/0354506 A1* | 12/2018 | Minemura | G01S 13/867 |
| 2019/0079181 A1* | 3/2019 | Mizuno | B60W 30/162 |
| 2020/0031341 A1* | 1/2020 | Kitamura | G08G 1/166 |
| 2020/0213340 A1* | 7/2020 | Hamada | H04L 12/40 |
| 2022/0227387 A1* | 7/2022 | Ozaki | G08G 1/09623 |
| 2022/0227395 A1* | 7/2022 | Aoki | B60W 40/04 |

FOREIGN PATENT DOCUMENTS

| | | |
|---|---|---|
| JP | 2010-276529 A | 12/2010 |
| JP | 2016-224669 A | 12/2016 |
| JP | 2017-220157 A | 12/2017 |
| JP | 2018-097765 A | 6/2018 |
| KR | 100228068 B1 * 12/1999 | ............. F02D 41/26 |

* cited by examiner

FIG. 7

Elements indicating correlation between positions $$P = \begin{pmatrix} P_{xx} & P_{xy} & P_{xv_x} & P_{xv_y} \\ P_{yx} & P_{yy} & P_{yv_x} & P_{yv_y} \\ P_{v_x x} & P_{v_x y} & P_{v_x v_x} & P_{v_x v_y} \\ P_{v_y x} & P_{v_y y} & P_{v_y v_x} & P_{v_y v_y} \end{pmatrix}$$

Elements indicating correlation between speeds

VEHICLE CONTROL SYSTEM AND VEHICLE CONTROL METHOD

TECHNICAL FIELD

The present invention relates to a vehicle control system that estimates a state of an object by using information on the object detected by different types of sensors.

BACKGROUND ART

Background art of the present technical field includes the following prior art. In PTL (JP 2018-97765 A), when a radar target indicating an object detected by a radar and an image target indicating an object detected by an image pickup device are generated from the same object, a fusion target is generated by integrating the radar target and the image target. Then, calculation is performed by using the position of the image target used to generate the fusion target, in a width direction of the own vehicle, as a lateral position, and using a movement speed in the width direction of the own vehicle as a lateral speed. PTL 1 discloses an object detection device that, when a fusion target is not generated by acquiring a radar target and not acquiring an image target, generates a provisional fusion target by the lateral position and the lateral speed of the image target used to generate the fusion target and a radar target acquired by a radar target acquisition unit (see Abstract).

CITATION LIST

Patent Literature

PTL 1: JP 2018-97765 A

SUMMARY OF INVENTION

Technical Problem

In the technique disclosed in PTL 1, a constant value is used for an observation error of a sensor (radar and image pickup device). Thus, grouping of a target having a position estimated from a plurality of sensor values may be erroneously performed, and one object may be erroneously recognized as a plurality of objects. In addition, although the tendency of the error varies depending on the type of the sensor, the observation value of the sensor with high accuracy is not selected and the recognition result of the sensor is not integrated. Thus, the recognition accuracy may be lowered as a whole. Furthermore, the error of the sensor varies depending on the environment of the external field, and the influence of the external field is not taken into consideration.

Solution to Problem

A representative example of the invention disclosed in this application is as follows. That is, a vehicle control system includes an integration unit that estimates information on a position and a speed of a target existing in an external field, and errors of the position and the speed based on information from a sensor that acquires information on the external field of an own vehicle. The integration unit estimates an error of a detection result from the detection result of a sensor that detects an external field of a vehicle in accordance with a characteristic of the sensor, determines correlation between detection results of a plurality of the sensors, and integrates correlated detection results and calculates the errors of the position and the speed of the target.

Advantageous Effects of Invention

According to one aspect of the present invention, it is possible to accurately obtain an error of an observation value of a sensor and improve accuracy of a grouping process. Objects, configurations, and effects other than those described above will be clarified by the descriptions of the following embodiments.

BRIEF DESCRIPTION OF DRAWINGS

FIG. 7 is a covariance matrix.

DESCRIPTION OF EMBODIMENTS

An embodiment will be described below with reference to the drawings.

Figure 1:
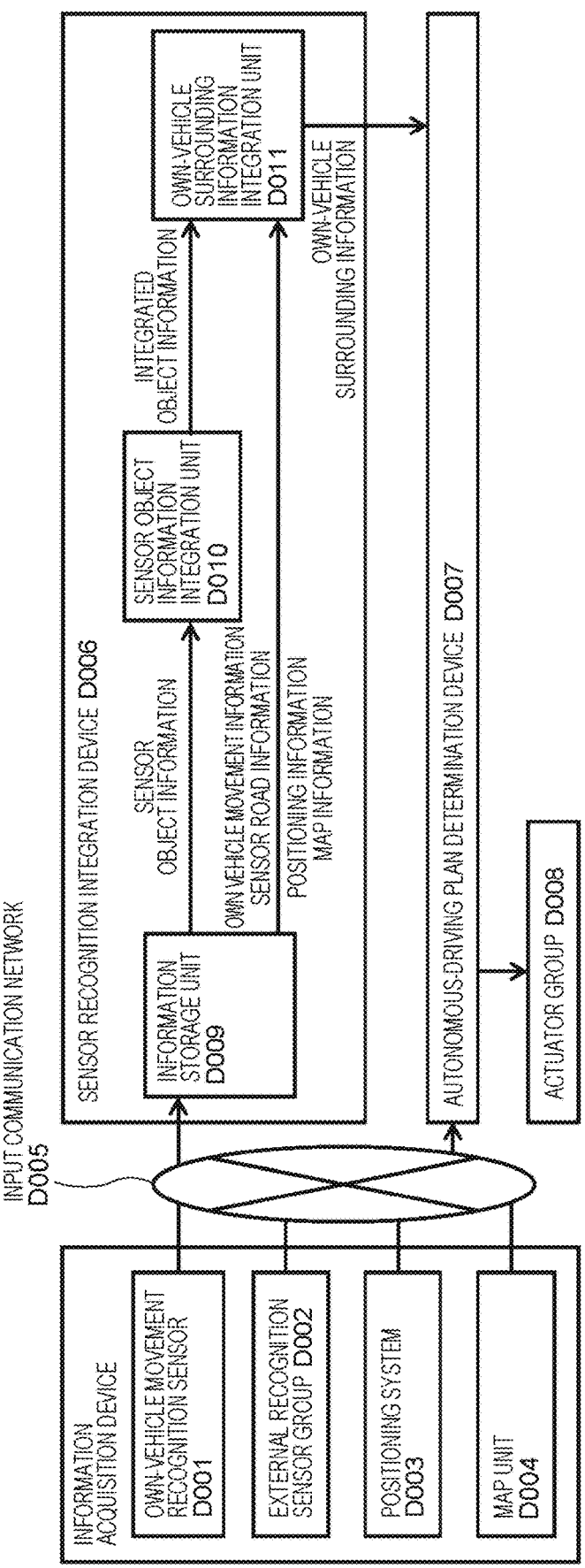
FIG. 1 is a configuration diagram illustrating a vehicle control system according to an embodiment of the present invention.

FIG. 1 is a configuration diagram illustrating a vehicle control system according to an embodiment of the present invention.

The vehicle control system in the present embodiment includes an own-vehicle movement recognition sensor D001, an external-field recognition sensor group D002, a positioning system D003, a map unit D004, an input communication network D005, a sensor recognition integration device D006, an autonomous-driving plan determination device D007, and an actuator group D008. The own-vehicle movement recognition sensor D001 includes a gyro sensor, a wheel speed sensor, a steering angle sensor, an acceleration sensor, and the like mounted on the vehicle, and measures a yaw rate, a wheel speed, a steering angle, an acceleration, and the like representing the movement of the own vehicle. The external-field recognition sensor group D002 detects a vehicle, a person, a white line of a road, a sign, and the like outside the own vehicle, and recognize information on the vehicle, the person, the white line, the sign, or the like. A position, a speed, and an object type of an object such as a vehicle or a person are recognized. The shape of the white line of the road including the position is recognized. For the expression, the position and the content of a sign are recognized. As the external-field recognition sensor group D002, sensors such as a radar, a camera, and a sonar are used. The configuration and number of sensors are not particularly limited. The positioning system D003 measures the position of the own vehicle. As an example of the positioning system D003, there is a satellite positioning system. The map unit D004 selects and outputs map information around the own vehicle. The input communication network D005 acquires information from various information acquisition devices, and transmits the information to the sensor recognition integration device D006. As the input communication network D005, the controller area network (CAN), Ethernet, wireless communication, and the like are used. The CAN is a network generally used in an in-vehicle system. The sensor recognition integration device D006 acquires own vehicle movement information, sensor object information, sensor road information, positioning information, and map information from the input communication network D005. Then, the sensor recognition integration device D006 integrates the pieces of information as own vehicle surrounding information, and outputs the own vehicle surrounding information to the autonomous-driving plan determination device D007. The autonomous-driving plan determination device D007 receives the information from the input communication network D005 and the own-vehicle surrounding information from the sensor recognition integration device D006. The autonomous-driving plan determination device plans and determines how to move the own vehicle, and outputs command information to the actuator group D008. The actuator group D008 operates the actuators in accordance with the command information.

The sensor recognition integration device D006 in the present embodiment includes an information storage unit D009, a sensor object information integration unit D010, and an own-vehicle surrounding information integration unit D011. The information storage unit D009 stores information (for example, sensor data measured by the external-field recognition sensor group D002) from the input communication network D005 and provides the information for the sensor object information integration unit D010 and the own-vehicle surrounding information integration unit D011. The sensor object information integration unit D010 acquires the sensor object information from the information storage unit D009 and integrates the information of the same object, which is detected by a plurality of sensors, as the same information. Then, the sensor object information integration unit outputs the integration result to the own-vehicle surrounding information integration unit D011, as integration object information. The own-vehicle surrounding information integration unit D011 acquires the integration object information, and the own vehicle movement information, the sensor road information, the positioning information, and the map information from the information storage unit D009. Then, the own-vehicle surrounding information integration unit D011 integrates the acquired information as own-vehicle surrounding information, and outputs the own-vehicle surrounding information to the autonomous-driving plan determination device D007.

The sensor recognition integration device D006 is configured by a computer (microcomputer) including an arithmetic operation device, a memory, and an input/output device.

The arithmetic operation device includes a processor and executes a program stored in the memory. A portion of the processing performed by the arithmetic operation device executing the program may be executed by another arithmetic operation device (for example, hardware such as a field programmable gate array (FPGA) and an application specific integrated circuit (ASIC)).

The memory includes a ROM and a RAM which are non-volatile storage elements. The ROM stores an invariable program (for example, BIOS) and the like. The RAM includes a high-speed and volatile storage element such as a dynamic random access memory (DRAM) and a non-volatile storage element such as a static random access memory (SRAM). The RAM stores a program executed by the arithmetic operation device and data used when the program is executed. The program executed by the arithmetic operation device is stored in a non-volatile storage element being a non-transitory storage medium of the sensor recognition integration device D006.

The input/output device is an interface that transmits processing contents by the sensor recognition integration device D006 to the outside or receives data from the outside, in accordance with a predetermined protocol.

Figure 2:
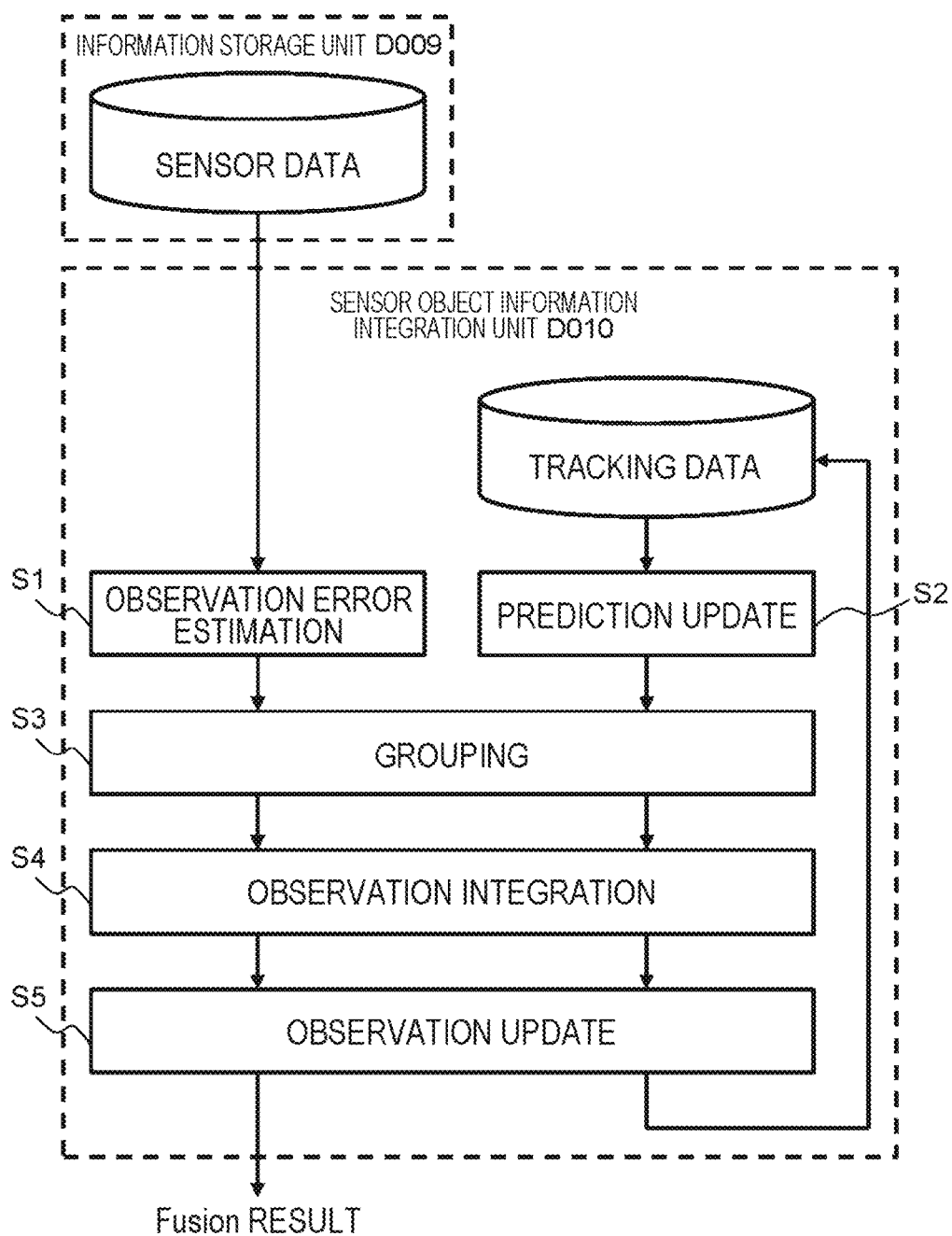
FIG. 2 is a flowchart illustrating an entirety of integration processing in the present embodiment.

FIG. 2 is a flowchart illustrating an entirety of integration processing in the present embodiment.

The information storage unit D009 stores sensor data.

The sensor data is information of an object (target) recognized by various sensors (radar, camera, sonar, and the like) of the external-field recognition sensor group D002, and includes data of a relative position, a relative speed, and a relative position/speed of the recognized object in addition to data of a distance and a direction to the object. The relative position/speed can be represented by a range (for example, a Gaussian distribution type error ellipse) in which the object exists at a predetermined probability at a predetermined time. The Gaussian distribution type error ellipse can be represented by a covariance matrix shown in the following expression, and may be represented in another format. For example, as another form, the existence range of the object may be represented by general distribution other than the Gaussian distribution, which is estimated using the particle filter.

The covariance matrix includes an element indicating a correlation between positions, an element indicating a correlation between speeds, and an element indicating a correlation between positions and speeds.

The covariance matrix is shown in FIG. 7.

The memory of the sensor object information integration unit D010 stores tracking data indicating a trajectory of an object recognized by the various sensors of the external-field recognition sensor group D002.

In the integration processing, first, the sensor object information integration unit D010 estimates an error of sensor data (S1). This error is determined by the type of sensor, the position of an object recognized within a recognition range (for example, if the distance to the object is long, the error is large, and the object recognized at the center of the recognition range has a small error), and an external environment (brightness of the external field, visibility, rainfall, snowfall, temperature, and the like). In addition, when coordinate systems of pieces of sensor data output from the various sensors of the external-field recognition sensor group D002 are different from each other, a plurality of pieces of sensor data are converted into one common coordinate system, and then an error of the sensor data is estimated. Details of an error estimation process (S1) will be described later.

The sensor object information integration unit D010 updates prediction data of the tracking data (S2). For example, assuming that the object represented by the tracking data performs a uniform linear motion from the previously recognized point without changing the moving direction and the speed, the position of the object at the next time is predicted, and the tracking data is updated. Details of a prediction data update process (S1) will be described later.

Then, the sensor object information integration unit D010 executes a grouping process of integrating data representing one object among the predicted position using the tracking data and the observed position using the sensor data (S3). For example, an overlap between the error range of the predicted position using the tracking data and the error range of the observed position using the sensor data is determined, and the predicted position and the observed position where the error ranges overlap each other are grouped as data representing the same object. Details of a grouping process (S3) will be described later.

Then, the sensor object information integration unit D010 integrates the observation results by using the data determined as the group representing the same object (S4). For example, a weighted average of the predicted positions and the observed positions grouped as the data representing the same object is calculated in consideration of errors of the predicted positions and the observed positions, and an integrated position of the object is calculated.

Then, the integrated position is output as a fusion result, and the tracking data is further updated (S5).

Figure 3:
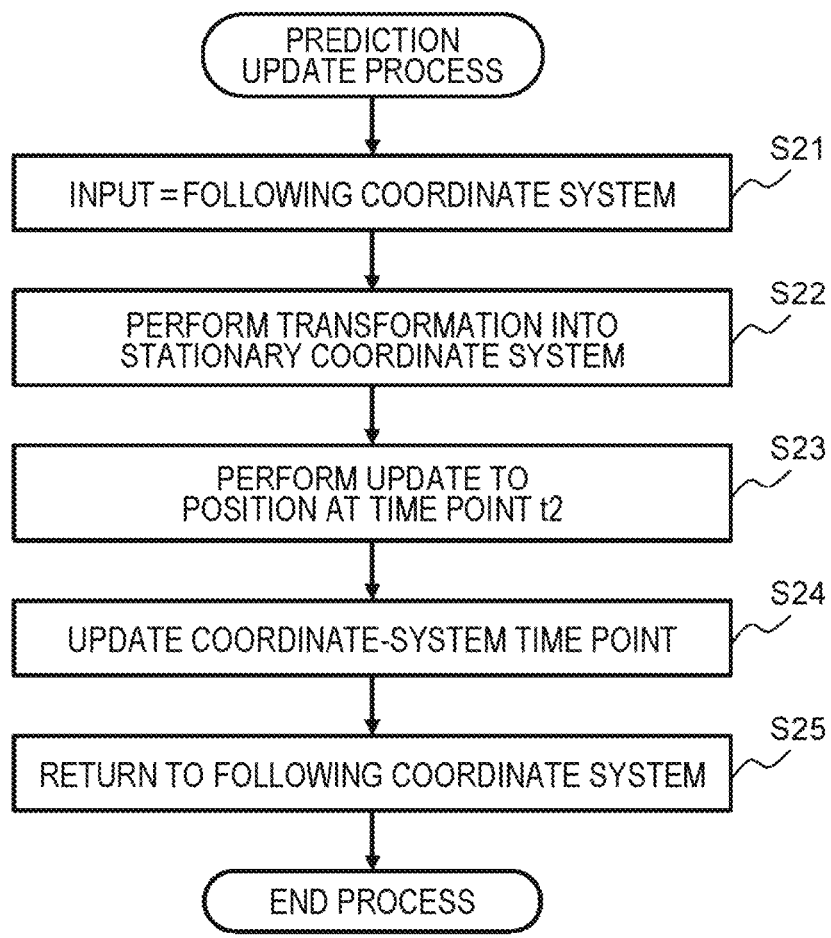
FIG. 3 is a flowchart of a prediction update process in Step S2.
Figure 4:
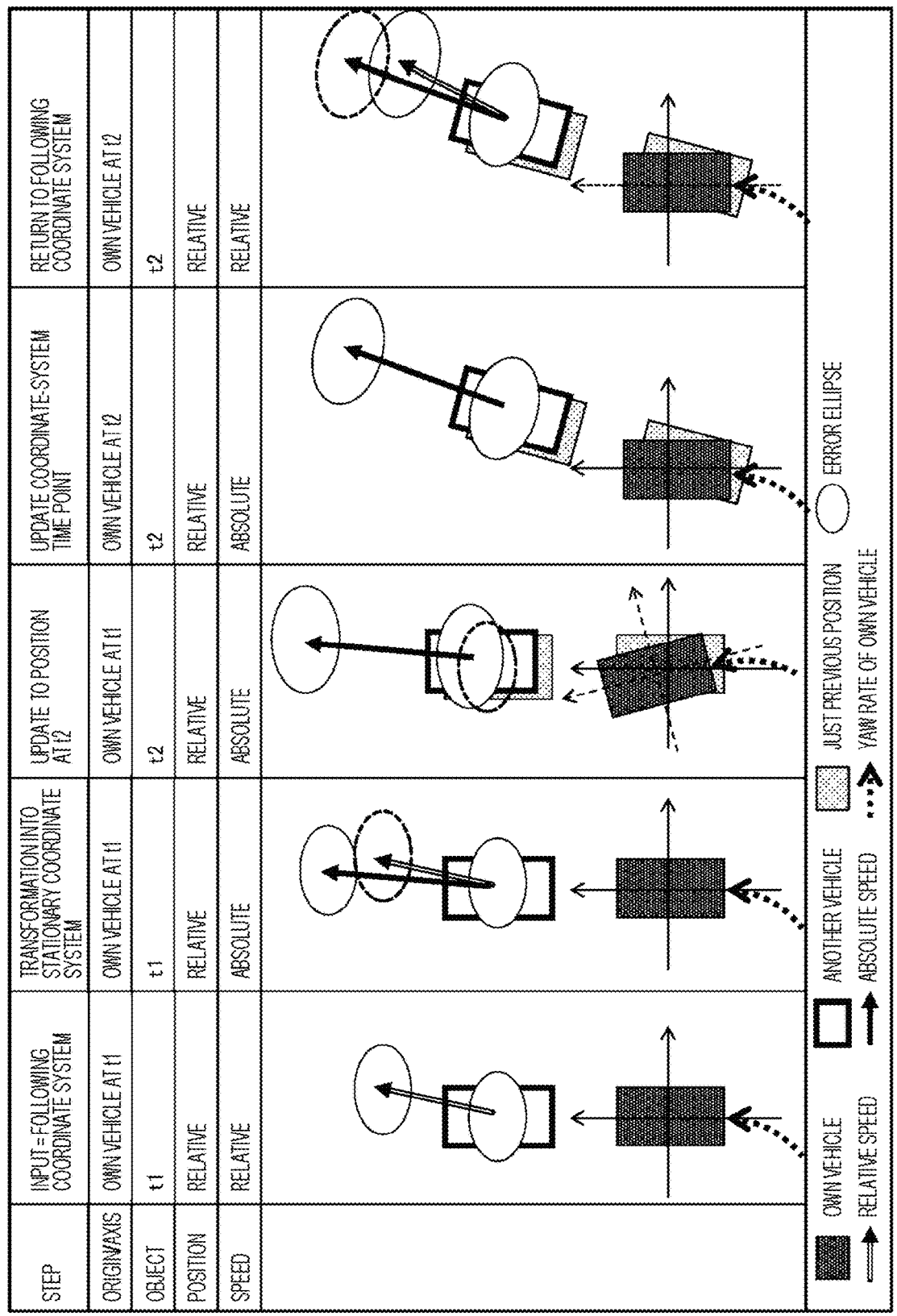
FIG. 4 is a diagram illustrating a process in Step S2.

FIG. 3 is a flowchart of the prediction update process in Step S2 of FIG. 2. FIG. 4 is a diagram illustrating a process in each step. In FIG. 4, the speed is represented by an arrow, the position is represented by a position on FIG. 4, and the position/relative speed is represented by an error ellipse.

First, the sensor object information integration unit D010 acquires a first relative speed Vr_t1_t1, a first relative position X_t1_t1, and a first relative position/relative speed Pr_t1_t1 of an object (e.g., another vehicle) around a vehicle at a predetermined time t1 (S21). The relative speed, the relative position, and the relative position/relative speed are generally represented in a following coordinate system (also referred to as a relative coordinate system) based on a vehicle center position of the own vehicle, but may be represented in a coordinate system based on the position of the sensor that has measured the sensor data.

Then, the sensor object information integration unit D010 converts the relative speed data in the following coordinate system into absolute speed data in a stationary coordinate system. For example, the sensor object information integration unit D010 uses the first relative position X_t1_t1 to convert the acquired first relative speed Vr_t1_t1 and first relative position/relative speed Pr_t1_t1 in the following coordinate system into a first absolute speed Va_t1_t1 and a first relative position/absolute speed Pa_t1_t1 in the stationary coordinate system (S22).

Then, the sensor object information integration unit D010 obtains the position at time t2 from the position at time t1. For example, with the position O_t1_t1 of the vehicle as the origin, the sensor object information integration unit D010 converts the first absolute speed Va_t1_t1, the first relative position X_t1_t1, and the first relative position/absolute speed Pa_t1_t1 at the time t1 into the second absolute speed Va_t2_t1, the second relative position X_t2_t1, and the second relative position/absolute speed Pa_t2_t1 at the time t2 (S23).

Then, the sensor object information integration unit D010 updates the origin position of the coordinate system from the time t1 to the time t2, that is, from the coordinate system at the time t1 to the coordinate system at the time t2. For example, the sensor object information integration unit D010 updates the second relative position X_t2_t1, the second absolute speed Va_t2_t1, and the second relative position/absolute speed Pa_t2_t1 of the object with the position O_t1_t1 of the vehicle at the time t1 as the origin, to the second relative position X_t2_t2, the second absolute speed Va_t2_t2, and the second relative position/absolute speed Pa_t2_t2 of the object with the position O_t2_t1 of the vehicle at the time t2 as the origin (S24).

In the conversion from the origin position O_t1_t1 at the time t1 to the origin position O_t2_t1 at the time t2, the measurement values (that is, the turning operation) of the vehicle speed and the yaw rate of the own vehicle are used.

Since the measured values of the vehicle speed and the yaw rate include errors, the error range indicated by the second relative position/absolute speed Pa_t2_t2 may be increased in consideration of the error of the vehicle speed and the error of the yaw rate.

Then, the sensor object information integration unit D010 converts the absolute speed data in the stationary coordinate system into relative speed data in the following coordinate system. For example, the sensor object information integration unit D010 uses the second relative position X_t2_t2 to convert the second absolute speed Va_t2_t2 and the second relative position/absolute speed Pa_t2_t2 in the stationary coordinate system into the second relative speed Vr_t2_t2 and the second relative position/relative speed Pr_t2_t2 in the following coordinate system in the updated coordinate system (S25).

As described above, according to the prediction update process of the present embodiment, it is possible to more accurately calculate the relative position/relative speed (error range).

In addition, it is possible to improve grouping performance of the sensor data of the target, and improve determination performance of an operation plan.

Next, details of the grouping process (S3) will be described.

Figure 5:
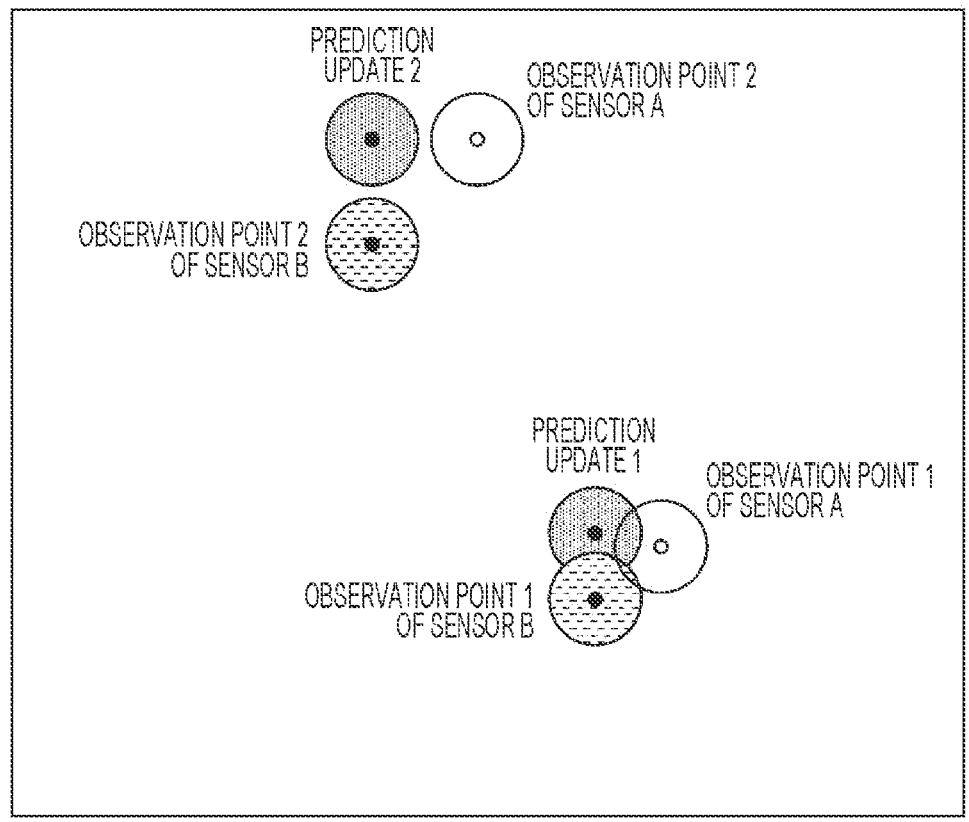
FIG. 5 is a diagram illustrating a grouping process (S3) in the related art.

For example, a case illustrated in FIG. 5, that is, a case where the observation values of a sensor A and a sensor B (e.g., of the external-field recognition sensor group D002) and the prediction update result are obtained, the error range of the observation value of the sensor is set to a constant value, and the error range after the prediction update is also set to a constant value is considered. At an observation point 1, the error range of the observation value of the sensor A, the error range of the observation value of the sensor B, and the error range of the prediction update result overlap each other. Therefore, three targets observed at the observation point 1 are integrated into one and recognized as one object. At the observation point 1 illustrated in FIG. 5, the three error ranges overlap each other. Even in a case where the error range of the observation value of the sensor A overlaps the error range of the prediction update result, and the error range of the observation value of the sensor B overlaps the error range of the prediction update result, that is, a case where the error range of the observation value of the sensor A and the error range of the observation value of the sensor B overlap each other via the error range of the prediction update result, the three targets are integrated into one and recognized as one object. At an observation point 2, there is no overlap between the error range of the observation value of the sensor A, the error range of the observation value of the sensor B, and the error range of the prediction update result.

Therefore, the three targets observed at the observation point 2 are not integrated into one and are recognized as three objects.

Figure 6:
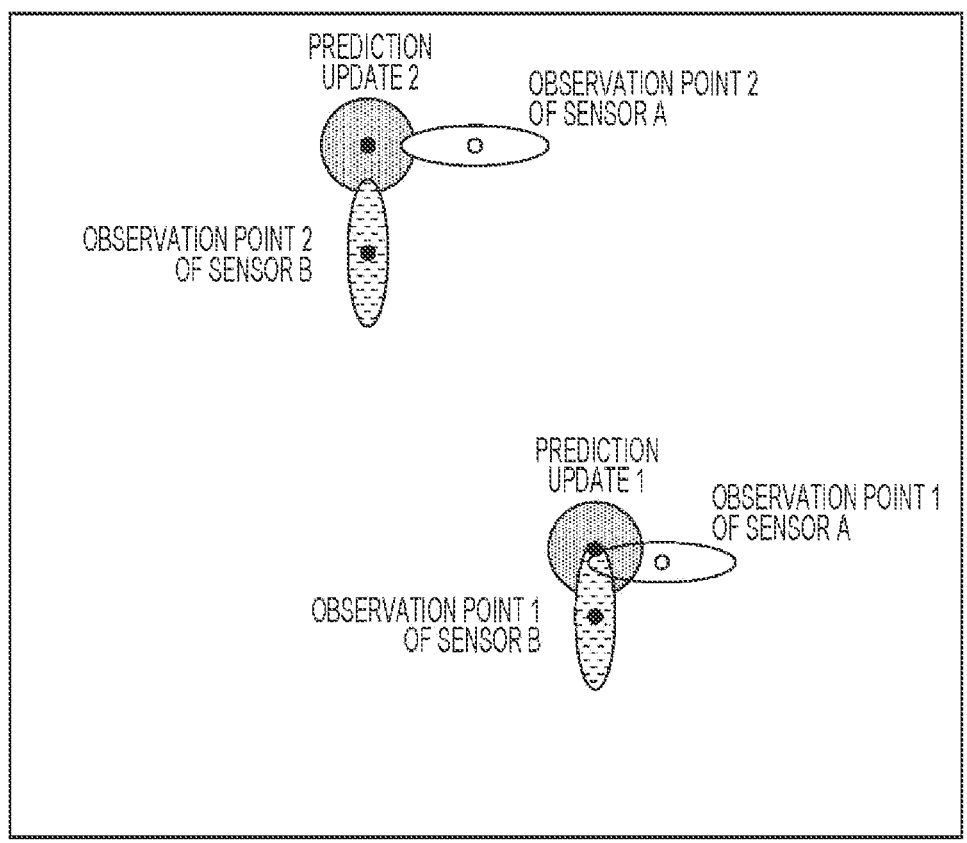
FIG. 6 is a diagram illustrating the grouping process (S3).

FIG. 6 is a diagram illustrating a grouping process (S3) in the present embodiment. In the present embodiment, the grouping process is executed by using the error range calculated in accordance with the type of the sensor. The sensor A is, for example, a radar that measures a distance and a direction to a target. The sensor A has a small error in a distance direction (vertical direction) that is a direction from the sensor to the target, but has a large error in a rotation direction (lateral direction) perpendicular to the distance direction. The sensor B is, for example, a camera that picks up an image of the external field. The sensor B has a small error in the rotation direction (horizontal direction), but has a large error in the distance direction (vertical direction). Therefore, an error range is obtained in consideration of the error characteristic depending on the type of the sensor, as illustrated in FIG. 6. When the grouping process is executed by using the error range calculated in this manner, the error range of the observation value of the sensor A, the error range of the observation value of the sensor B, and the error range of the prediction update result overlap each other at the observation point 1, similarly to the above description (FIG. 5). Thus, the three targets observed at the observation point 1 are integrated into one and recognized as one object. In addition, at the observation point 2, the error range of the observation value of the sensor A overlaps the error range of the prediction update result, and the error range of the observation value of the sensor B overlaps the error range of the prediction update result. Thus, the three targets observed at the observation point 2 are integrated into one and recognized as one object.

In the error estimation process (S1) in the present embodiment, since the error is calculated in accordance with the type and characteristic of the sensor, and the error range is set, it is possible to accurately integrate targets observed by the plurality of sensors, and recognize the targets as one object. That is, since the accuracy of the grouping process is improved and the position of an object outside the vehicle can be accurately observed, it is possible to accurately control the vehicle.

In addition, in the present embodiment, the error may be calculated in accordance with the observation result of the sensor. Therefore, the sensor object information integration unit D010 may determine the error range by using a function using the observation result (for example, the distance to the target) as a parameter. The sensor object information integration unit D010 may determine the error range by using an error table set in advance instead of the function.

For example, the sensor generally has a larger error at a detection end than at the center of a detection range. Therefore, the error of the target detected at the center of the detection range may be set to be small, and the error of the target detected at a portion closer to the end of a detection displacement may be set to be larger.

In addition, the radar being a type of sensor has a small error in the distance direction (vertical direction) and a large error in the rotation direction (horizontal direction), but the error range varies depending on the distance to the target. That is, the error in the rotation direction (horizontal direction) increases in proportion to the distance, and the error in the distance direction (vertical direction) is substantially the same regardless of the distance. In addition, in the radar having a range switching function, the error in the rotation direction (horizontal direction) increases on the wide-angle side (short-distance side), and the error in the distance direction (vertical direction) is substantially the same regardless of the range.

The camera being a type of sensor has a small error in the distance direction (vertical direction) and a large error in the rotation direction (horizontal direction), but the error range varies depending on the distance to the target. That is, the error in the rotation direction (horizontal direction) increases in proportion to the distance, and the error in the distance direction (vertical direction) increases in proportion to the square of the distance.

As described above, in the present embodiment, since the error of the sensor is calculated in accordance with the position of the observed target and the error range is set, it is possible to accurately obtain the error of the observation value of the sensor. In particular, when the distance to the target is large, the error is increased, the error is changed in accordance with the detection direction of the target, the error of the target close to the end of the detection range is increased, and the error is increased on the wide-angle side. Therefore, it is possible to use an appropriate error range for the grouping process. Therefore, it is possible to accurately integrate targets observed by a plurality of sensors and recognize the targets as one object. That is, since the accuracy of the grouping process is improved and the position of an object outside the vehicle can be accurately observed, it is possible to accurately control the vehicle.

In the present embodiment, the error may be calculated in accordance with the environment of the external field. For example, the sensor error is small in good weather and large in rainy weather. In addition, the camera being a type of sensor has a small error during daytime when the illuminance of the external field is high, and has a large error during nighttime when the illuminance of the external field is low.

As described above, in the present embodiment, since the error is calculated in accordance with the environment outside the vehicle, it is possible to calculate a more accurate error,' to improve the accuracy of the grouping process, and to accurately control the vehicle.

The present invention is not limited to the above-described embodiment, and includes various modifications and equivalent configurations within the spirit of the appended claims. For example, the above examples are described in detail in order to explain the present invention in an easy-to-understand manner, and the present invention is not necessarily limited to a case including all the described configurations. In addition, a portion of the configuration of one example may be replaced with the configuration of another example. Further, the configuration of one example may be added to the configuration of another example.

Regarding some components in the examples, other components may be added, deleted, and replaced.

In addition, some or all of the above-described configurations, functions, processing units, processing means, and the like may be realized by hardware by, for example, designing with an integrated circuit, or may be realized by software by a processor interpreting and executing a program for realizing each function.

Information such as a program, a table, and a file, that realizes each function can be stored in a memory, a storage device such as a hard disk and a solid state drive (SSD), or a recording medium such as an IC card, an SD card, and a DVD.

Control lines and information lines considered necessary for the descriptions are illustrated, and not all the control lines and the information lines in mounting are necessarily shown. In practice, it may be considered that almost all components are connected to each other.

REFERENCE SIGNS LIST

D001 own-vehicle movement recognition sensor
D002 external-field recognition sensor group
D003 positioning system
D004 map unit
D005 input communication network
D006 sensor recognition integration device
D007 autonomous-driving plan determination device
D008 actuator group
D009 information storage unit
D010 sensor object information integration unit D011 own-vehicle surrounding information integration unit

The invention claimed is:

1. A vehicle control system comprising:
a plurality of sensors, each of which is configured to detect an object in an external field of an own vehicle in accordance with a characteristic of each sensor; and
one or more memory devices having a program stored thereon that, when executed by one or more processors, cause the one or more processors to:
   estimate information on a position and a speed of a target detected by at least one of the plurality of sensors,
   estimate, based on a detection result, the characteristic, and a type of the at least one sensor, an error of the detection result and a range of the error,
   based on the error and the range of the error, determine correlation between detection results for targets detected by at least two of the plurality of sensors,
   determine whether to recognize the targets as the object by integrating correlated detection results, and
   calculate the errors of the position and the speed of the target object, wherein the vehicle control system controls the own vehicle based at least in part on calculated errors of the position and the speed of the object.

2. The vehicle control system according to claim 1, wherein the error is represented by probability distribution.

3. The vehicle control system according to claim 1, wherein the one or more processors are configured to:
   predict a position and a speed of the target and errors of the position and the speed at a second time after a first time, from a position and a speed of the target and errors of the position and the speed at the first time without using the detection result of the at least one sensor,
   determine correlation between the detection results of the plurality of sensors and a predicted position of the target,
   integrate the detection result and the predicted position of the target, which are correlated with each other, and
   calculate the errors of the position and the speed of the object target.

4. The vehicle control system according to claim 1, wherein the one or more processors are configured to: estimate the error of each of the detection results after converting the detection results of the plurality of sensors into one coordinate system.

5. The vehicle control system according to claim 1, wherein the one or more processors are configured to: estimate the error of the detection result in accordance with the position of the target.

6. The vehicle control system according to claim 5, wherein the one or more processors are configured to: estimate the error such that the error of the detection result increases as a distance to the target increases.

7. The vehicle control system according to claim 6, wherein the one or more processors are configured to: estimate the error such that the error of the detection result is proportional to a square of the distance to the target.

8. The vehicle control system according to claim 1, wherein the one or more processors are configured to: estimate the error such that the error of the detection result increases as approaching an end of a detection range of the sensor.

9. The vehicle control system according to claim 1, wherein the one or more processors are configured to: estimate the error such that the error of the detection result increases as the characteristic of the sensor changes to a wide-angle side.

10. A vehicle control method comprising:
   detecting, by each of a plurality of sensors, an object in an external field of an own vehicle in accordance with a characteristic of each sensor;
   estimating information on a position and a speed of a target detected by at least one of the plurality of sensors;
   estimating, based on a detection result, the characteristic, and a type of the at least one sensor, an error of the detection result and a range of the error;
   based on the error and the range of the error, determining correlation between detection results for targets detected by at least two of the plurality of sensors;
   determining whether to recognize the targets as the object by integrating correlated detection results;
   calculating the errors of the position and the speed of the object; and
   controlling the own vehicle based at least in part on calculated errors of the position and the speed of the object.

* * * * *